United States Patent
Derosa et al.

(10) Patent No.: US 7,580,219 B2
(45) Date of Patent: Aug. 25, 2009

(54) CONTROLLING SEEKS USING NON-LINEAR SWITCHING CURVES

(75) Inventors: Jeffrey V. Derosa, Burlington, MA (US); Orhan Beker, Aliso Viejo, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 444 days.

(21) Appl. No.: 11/708,817

(22) Filed: Feb. 21, 2007

(65) Prior Publication Data

US 2007/0253099 A1   Nov. 1, 2007

Related U.S. Application Data

(60) Provisional application No. 60/745,676, filed on Apr. 26, 2006.

(51) Int. Cl.
*G11B 5/55* (2006.01)
(52) U.S. Cl. .............. 360/78.06; 360/78.07; 360/78.14
(58) Field of Classification Search ................ None
See application file for complete search history.

(56) References Cited

U.S. PATENT DOCUMENTS

| 5,254,920 | A | * | 10/1993 | Agarwal et al. | ............. | 318/560 |
| 5,781,365 | A | * | 7/1998 | Romano et al. | .......... | 360/78.06 |
| 6,510,019 | B1 | | 1/2003 | DeRosa | | |
| 6,515,820 | B1 | * | 2/2003 | Burton et al. | ............ | 360/78.06 |
| 6,597,529 | B1 | | 7/2003 | DeRosa | | |
| 7,382,570 | B1 | * | 6/2008 | Li et al. | .................. | 360/78.06 |

* cited by examiner

*Primary Examiner*—Hoa T Nguyen
*Assistant Examiner*—James L Habermehl
(74) *Attorney, Agent, or Firm*—David K. Lucente

(57) ABSTRACT

Controlling seeking of a transducer includes accelerating the transducer to a seek velocity, generating a linearized switching curve defining a position and velocity of the transducer at which deceleration should begin, and controlling the velocity of the transducer in response to the current position and seek velocity of the transducer relative to the linearized switching curve. The linearized switching curve has a slope and an offset that are determined in response to the seek velocity and a current position of the transducer relative to a nonlinear switching curve.

23 Claims, 6 Drawing Sheets

CONTROLLING SEEKS USING NON-LINEAR SWITCHING CURVES

RELATED APPLICATION

This application claims the benefit of and priority to U.S. Provisional Patent Application No. 60/745,676 entitled "Non-Linear Switching Curve for Disk Drive Actuator," filed Apr. 26, 2006, the disclosure of which is hereby incorporated herein by reference as if set forth in its entirety.

BACKGROUND

The present invention generally relates to controlling the seeking of an element in a servo control system and, more particularly, to seeking a transducer between tracks on a disk in a disk drive.

Disk drives are digital data storage devices that can store and retrieve large amounts of data in a fast and efficient manner. A typical disk drive includes a plurality of magnetic recording disks that are mounted to a rotatable hub of a spindle motor and rotated at a high speed. An array of read/write transducers is disposed adjacent to surfaces of the disks to transfer data between the disks and a host computer. The transducers can be radially positioned over the disks by a rotary actuator and a closed loop, digital servo system, and can fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek operation, a selected transducer is moved from an initial track to a destination track on the corresponding disk surface. The servo system applies current to an actuator coil to first accelerate and then decelerate the transducer toward the destination track.

During the seek, the servo system may sequentially measure the actual velocity of the transducer and adjust the current in relation to velocity error (i.e., the difference between the actual velocity and a target velocity). As the transducer approaches the destination track, the servo system initiates a settle mode to bring the transducer to rest over the destination track within a selected settle threshold, such as a percentage of the track width from track center. Thereafter, the servo system enters the track following mode wherein the transducer is nominally maintained over the center of the destination track until another seek is performed.

As noted above, disk drives typically use current driven actuators that include voice coil motors, which respond to a current signal by accelerating or decelerating the transducer depending on the polarity of the current signal applied to the motor. Actuator currents can be quite high; for example, peak actuator currents can be from 1-2 amps. Thus, power consumption can be an issue, particularly for disk drives whose disks spin at a high angular velocity.

SUMMARY

Some embodiments provide controlling seeking of a transducer. The transducer is accelerated to a seek velocity, and a linearized switching curve defining a position and velocity of the transducer at which deceleration should begin is generated. The velocity of the transducer is controlled in response to the current position and seek velocity of the transducer relative to the linearized switching curve. The linearized switching curve has a slope and an offset that are determined in response to the seek velocity and a current position of the transducer relative to a nonlinear switching curve.

Methods of controlling seeking of a transducer that is adjacent to a rotatable disk in a disk drive according to some embodiments include accelerating the transducer radially across the rotatable disk from an initial track toward a destination track by applying an acceleration current to an actuator associated with the transducer, and estimating a time before a current trajectory of the transducers will cross a linearized switching curve having a slope and an offset that are determined in response to a current velocity and a current position of the transducer relative to a nonlinear switching curve.

A disk drive according to some embodiments includes a rotatable storage disk, a transducer adjacent to the rotatable storage disk, an actuator configured to move the transducer from an initial track to a target track on the rotatable storage disk, and a servo controller that accelerates the transducer to a seek velocity in response to a seek command. The servo controller generates a linearized switching curve defining a position and velocity of the transducer at which deceleration should begin and controls the velocity of the transducer in response to the current position and seek velocity of the transducer relative to the linearized switching curve. The linearized switching curve has a slope and an offset that are determined in response to the seek velocity and a current position of the transducer relative to a nonlinear switching curve.

BRIEF DESCRIPTION OF THE DRAWINGS

The accompanying drawings, which are included to provide a further understanding and are incorporated in and constitute a part of this application, illustrate certain embodiment(s). In the drawings.

DETAILED DESCRIPTION OF EMBODIMENTS

Embodiments will be described more fully hereinafter with reference to the accompanying drawings, in which embodiments are shown. However, this invention should not be construed as limited to the embodiments set forth herein. Rather, these embodiments are provided so that this disclosure will be thorough and complete, and will fully convey the scope to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions. As used herein the term "and/or" includes any and all combinations of one or more of the associated listed items. Similarly, a list of items separated by the symbol "/" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Embodiments may include apparatus, methods, and/or computer program products. Accordingly, embodiments may include hardware and/or in software (including firmware, resident software, micro-code, etc.). Furthermore, some embodiments may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

Some embodiments are described below with reference to block diagrams and/or operational illustrations of apparatus, methods, and computer program products according to embodiments. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
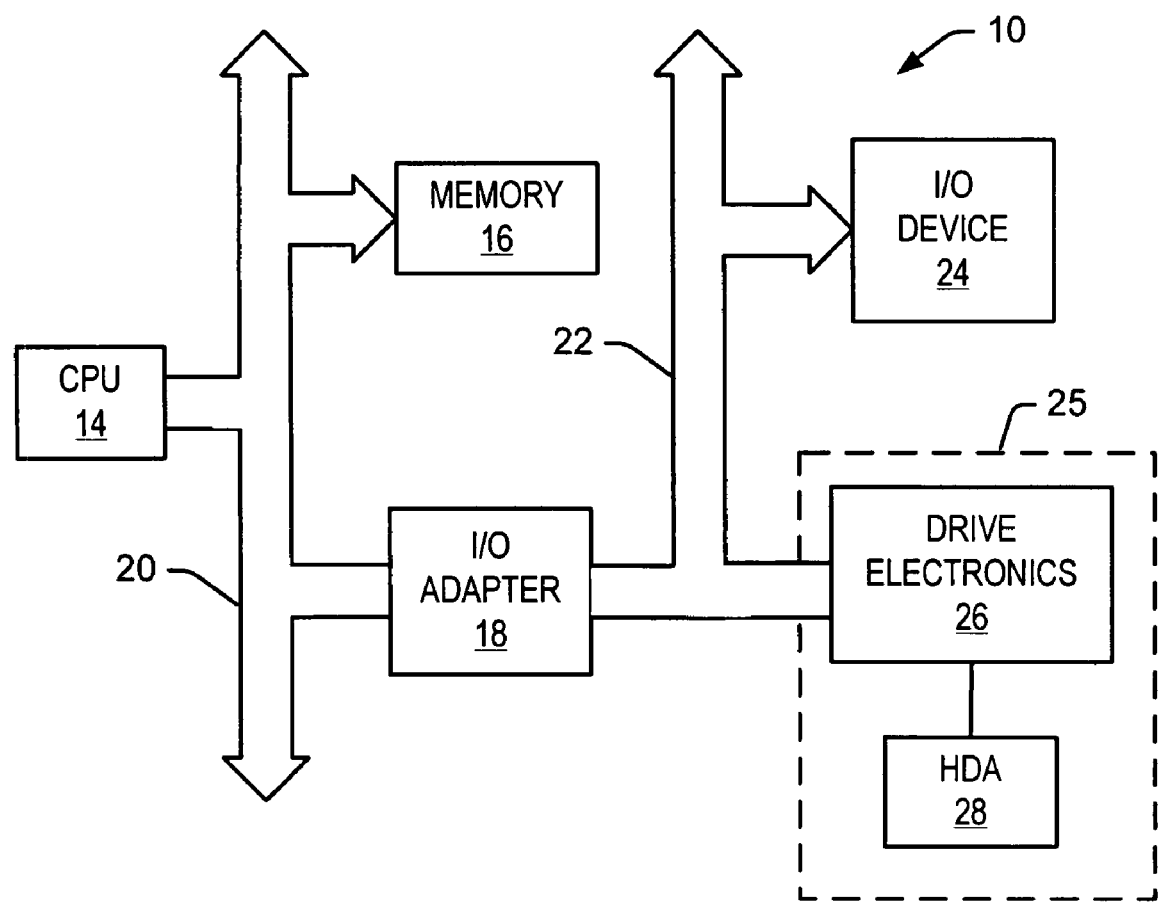
FIG. 1 is a block diagram of an exemplary computer system that includes a disk drive.

Referring to FIG. 1, an exemplary computer system 10 is shown that includes a central processing unit ("CPU") 14, a main memory 16, and I/O bus adapter 18, all interconnected by a system bus 20. Coupled to the I/O bus adapter 18 is I/O bus 22, that may be, for example, a small computer system interconnect (SCSI) bus, firewire bus, and/or a universal serial bus. The I/O bus 22 supports various peripheral devices 24 and a data storage unit such as a disk drive 25. The disk drive 25 includes drive electronics 26 and a head disk assembly 28 ("HDA").

Figure 2:
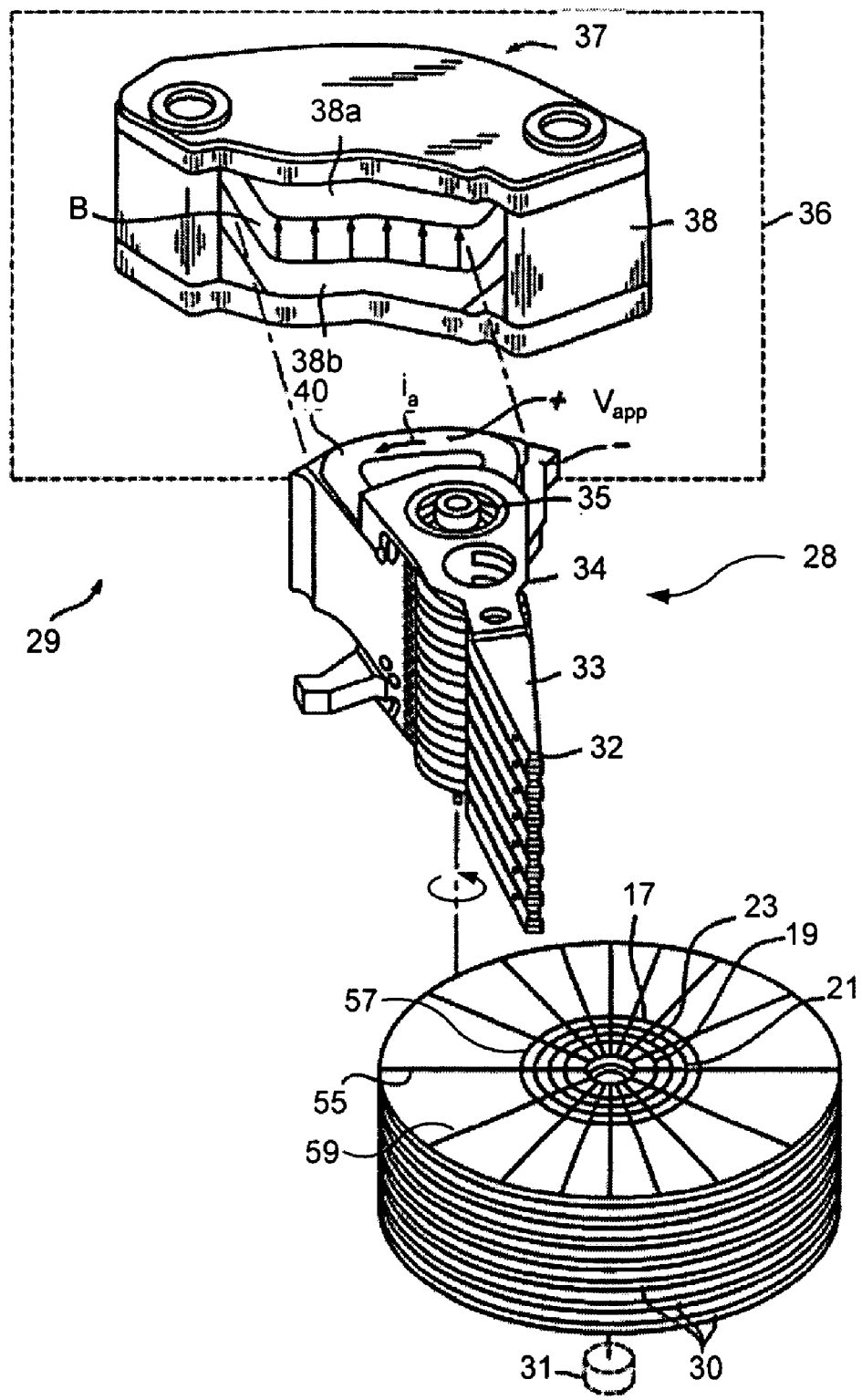
FIG. 2 is a diagram of an exemplary head disk assembly of the disk drive.

Referring to FIG. 2, an exemplary embodiment of the HDA 28 of FIG. 1 is shown that includes an actuator 29 and disks 30 that can be rotated by a spindle motor 31. Data can be stored on the disks 30 in concentric circular data tracks 17 that are divided into alternating data sectors 57 and servo sectors 55. The servo sectors 55 are generally aligned in a radial fashion on the disks 30, and a group of servo sectors 55 that are radially aligned can sometimes be referred to as "spokes" 59. Since the disks 30 are rotated by spindle motor 31 at a constant angular velocity (e.g. 10,000 rpm), the spokes 59 pass under the transducers 32 at constant intervals. Thus, the number of spokes 59 passing beneath the transducers 32 may provide a measure of time.

The data can be written and read from the disks 30 via magnetic transducers 32 which are attached as loads to flexible load beams 33 extending from actuator arms 34. The actuator arms 34 pivot about point 35 to move the load beams 33 in a radial direction over the storage surfaces of the disks 30 from an initial track 19 towards a target track 21 shown in FIG. 2 by example. At the target track 21, the magnetic transducers 32 can read from and/or write data on the disks 30. A motor 36 controls the radial movement of the actuator arms 34 in response to an input actuator current $i_a$. Although the disks 30 are described as magnetic disks for purposes of illustration, the disks 30 may alternatively be optical disks or any other type of storage disk which can have data storage tracks defined on one or both of its storage surfaces.

The exemplary motor 36 can include a magnet 37 containing two plates 38a, 38b coupled together via a pair of sidewalls to form a flat toroidal shaped member 38. A wire coil 40 attached to the actuator arms 34 is disposed between the two plates 38a and 38b. The magnet 37 may generate a constant magnetic field B between the plates 38a and 38b. When the input actuator current $i_a$ is passed through the coil 40 disposed in the magnetic field B, a torque is produced on the actuator arms 34 resulting in radial motion of the arms 34 about a pivot point 35. The polarity of the input actuator current $i_a$ determines the direction of the force applied to the actuator arms 34.

Figure 3A:
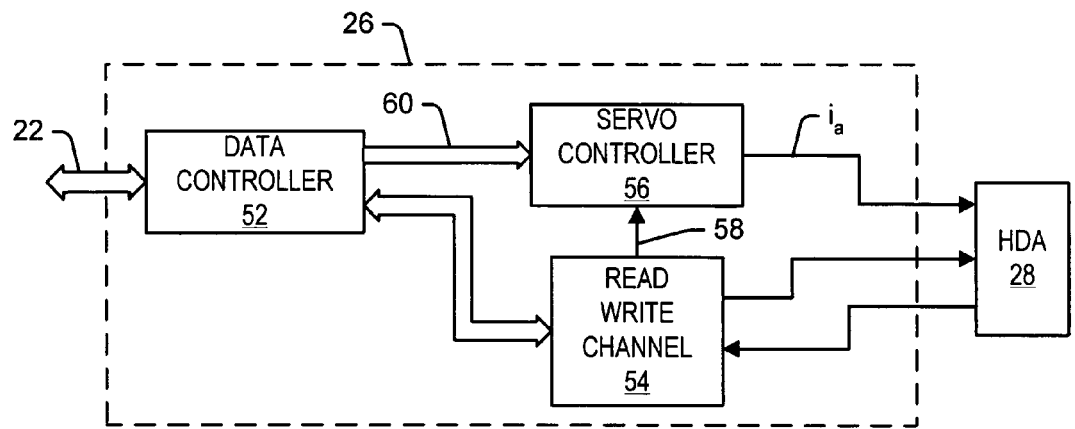
FIG. 3A is a block diagram of the drive electronics of the disk drive that is configured according to some embodiments.

Referring to FIG. 3A, the drive electronics 26 (FIG. 1) includes a data controller 52, a read/write channel 54, and a servo controller 56. A data transfer initiated by the CPU 14 to the disk drive 25 may involve, for example, a DMA transfer of data from the memory 16 onto the system bus 20 (FIG. 1). Data from the system bus 20 are transferred by the I/O adapter 18 onto the I/O bus 22. The data are read from the I/O bus 22 by the data controller 52, which formats the data into blocks with the appropriate header information and transfers the digital data to the read/write channel 54. The read/write channel 54 can operate in a conventional manner to convert data between the digital form used by the data controller 52 and the analog form used by the transducers 32. For the transfer from the CPU 14 to the HDA 28, the read/write channel 54 converts the data to an analog form suitable for writing by a transducer 32 to the HDA 28. The read/write channel 54 also provides servo positional information read from the HDA 28 to the servo controller 56 on lines 58. For example, the concentric data tracks 17 on the storage surface of a data disk 30 can be broken up and divided into segments by a plurality of regularly spaced apart embedded servo sectors 55 (FIG. 2). Each servo sector 55 can include transducer location information such as a track identification field and data block address, for identifying the track and data block, and burst fields to provide servo fine location information. The transducer location information can be used to detect the location of the transducer 32 in relation to that track and data block within the track. The transducer location information is induced into the transducer 32, converted from analog signals to digital data in the read/write channel 54, and transferred to the servo controller 56. The servo controller 56 can use the transducer location information for performing seek and tracking operations of the transducer 32 over the disk tracks 17.

The data controller 52 also provides data that identifies the target track location and the addressed data block on lines 60 to the servo controller 56. The time to perform a seek from between an initial track to a target track is typically known as "seek time". The servo controller 56 generates a current command, which is a voltage signal that is converted into the input actuator current $i_a$, and provided to the actuator 29 to move the transducer 32 radially across the disk 30. The seek time is thus dependent on the magnitude of the current command.

Figure 3B:
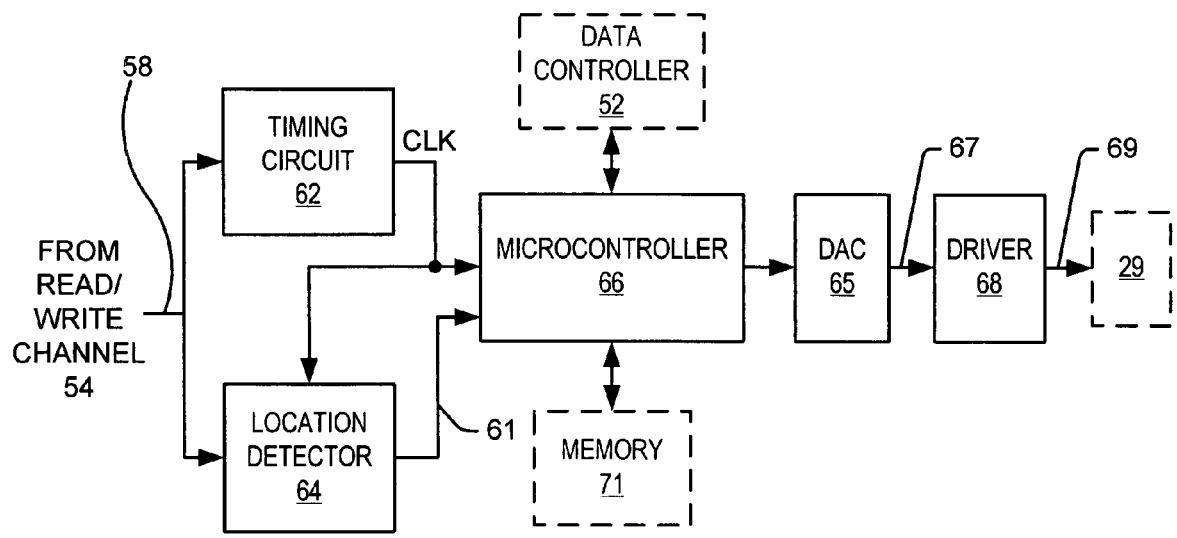
FIG. 3B is a block diagram of a servo controller configured according to some embodiments.

The servo controller 56 is described in more detail with reference to FIG. 3B. As shown therein, the servo controller 56 can include a timing circuit 62, a location detector 64, a microcontroller 66, a digital to analog converter (DAC) 65, and a current driver 68. The timing circuit 62 can generate clock signals synchronized with the passage of servo sectors 55 on tracks under the transducer 32. The timing circuit 62 can include a counter and a phase locked loop for generating the clock signals. Based on the clock signals from the timing circuit 62 and transducer location data provided by the read/write channel 54, the location detector 64 detects a location of the transducer 32 relative to tracks 17 on the disk 30 and data blocks within the tracks 17. The detected transducer location information in each servo sector 55 provides the address of the track which contains the servo sector 55, and therefore, the location of the transducer 32 relative to that track. The timing circuit 56 is synchronized with the read/write channel 54, and the location detector 64 receives the transducer location data from the read/write channel 54.

The microcontroller 66 controls movement and positioning of the transducer 32 during seek operations. In response to clock signals from the timing circuit 62, where each clock signal indicates passage of a servo sector 55 under the transducer 32. The microcontroller 66 obtains the transducer location information from the location detector 64.

The microcontroller 66 then utilizes the transducer location information in conjunction with the destination track data from the data controller 52, to generate the current command for moving and/or positioning the transducer 32. The current command generated by the microcontroller 66 is converted to analog by a digital to analog converter 65 and is provided to a driver 68 on path 67. The driver 68 supplies the actuator current $i_a$ to the actuator 29 on path 69 in proportion to the current command, up to a maximum current supply capability of the driver 68. When the actuator current $i_a$ is applied to the motor 36, the actuator arm 34 moves radially inward or radially outward across the surface of the disk 30 to perform a seek operation.

Figure 4:
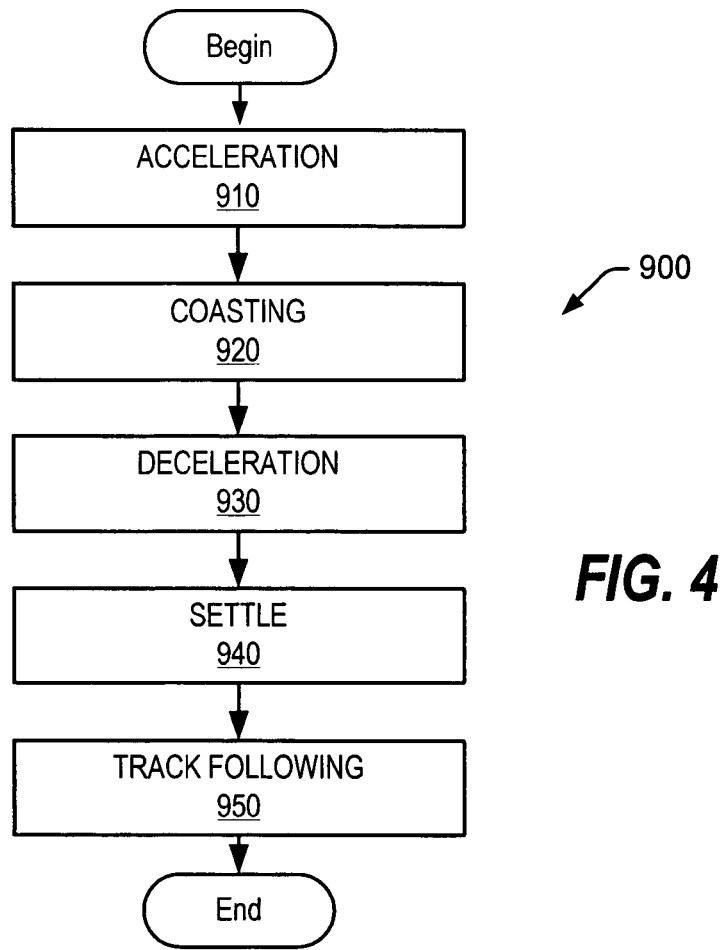
FIG. 4 is a flowchart illustrating stages of a typical seek operation of a disk drive.

Referring to FIG. 4, a seek operation 900 may include a number of stages. At the beginning of the seek operation 900, there is an acceleration stage (block 910) during which the transducer 32 is accelerated up to a maximum seek velocity. The transducer 32 is accelerated by applying a current signal having a first polarity (e.g. a positive current signal) to the coil 40 in the actuator 29. After acceleration, there may be a period during which the transducer 32 travels at a relatively constant velocity (i.e. coasts) across the surface of the disk (block 920). Very little actuator current may be required during the coasting stage of the seek. As the transducer 32 approaches the target track, the transducer is decelerated during a deceleration stage (block 930) by applying a current signal having a second polarity, opposite to the first polarity (e.g. a negative current signal) to the coil 40. In some cases, there may be no coasting stage. Rather, the seek operation may transition directly from the acceleration stage to the deceleration stage.

In order to align the transducer over the target track, the seek operation then enters a settle stage (block 940) in which the position of the transducer 32 is adjusted at a fine level until a detected position of the transducer 32 is within an acceptable distance from the center of the target track. Once the transducer 32 has settled on the target track, the servo controller 56 enters a track following stage, in which the transducer 32 is maintained above the center of the target track as the disk 30 rotates beneath the transducer 32 (block 950).

Figure 5:
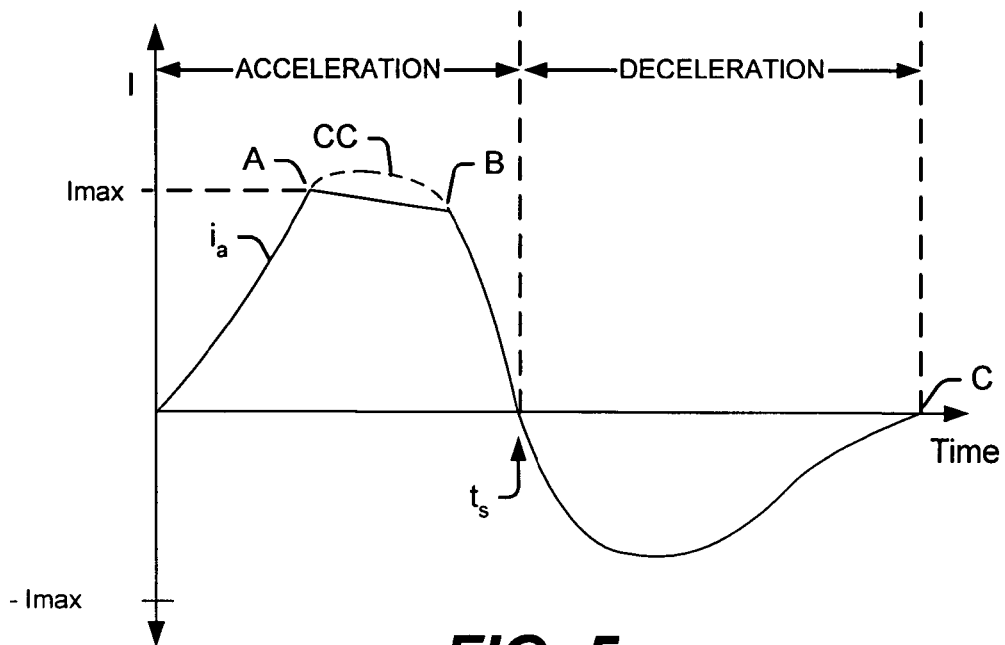
FIG. 5 is a graph of an exemplary actuator current profile for a seek operation.

Some aspects of a seek operation are illustrated in FIG. 5, which is an exemplary plot of an actuator current ($i_a$) profile and a current command (CC) profile versus time. As shown in FIG. 5, when the seek operation begins, there is an acceleration stage during which the actuator current $i_a$ is increased to a maximum current level ($I_{max}$) at point A. As explained above, the maximum current may be a current at which the actuator current saturates. However, the current command (CC), which is a voltage signal applied to the current driver 68, may continue to increase even after the actuator current has reached $I_{max}$. As further illustrated in FIG. 5, after the actuator current $i_a$ has reached $I_{max}$, the actuator current $i_a$ decreases slightly in an approximately linear fashion until the current command CC decreases to the point that the actuator current $i_a$ and the current command CC converge again at point B. The reason for the slight decrease in actuator current $i_a$ between point A and point B is that as the transducer 32 is accelerated, back-EMF (electromotive force) builds up in the motor 36 and opposes the flow of the actuator current. The level of back-EMF may be modeled as a constant $k_e$ multiplied by the velocity of the transducer (v(t)). Thus, the effect of back-EMF is to reduce the actuator current as a function of time over some portions of the seek operation. As the seek operation approaches a switching point between acceleration and deceleration at time $t_s$, the actuator current is reduced, such that it becomes zero at the switching point ($t_s$). After the switching point, the transducer 32 is decelerated by a negative actuator current during the deceleration stage until the transducer 32 reaches the target track, at which point the velocity of the transducer 32 is zero.

In the seek profile shown in FIG. 5, it is assumed that there is no coasting mode between acceleration and deceleration. However, it will be understood that the servo controller 56 may enter a coasting mode following the acceleration mode once the transducer 32 has reached a maximum velocity. In that case, the servo controller 56 will switch to the deceleration mode from the coasting mode, rather that from the acceleration mode. In some aspects, the coasting mode may be viewed simply as an extension of the acceleration mode, albeit with a saturated velocity. Once the servo controller 56 switches to deceleration mode, the deceleration continues until the transducer 32 reaches the target track at point C, at which point the servo controller 56 switches to settle mode.

The timing and manner in which the servo controller 56 is switched from acceleration mode to deceleration mode may play an important role in seek time and/or seek acoustics, both of which are important factors in disk drive performance. Soft-switching and acceleration-tracking seek control algorithms have been developed to improve seek performance and/or reduce seek acoustics. See, e.g. U.S. Pat. No. 6,597, 529 entitled "Method And Apparatus For Reducing Acoustic Noise In Servo-Controlled System" and U.S. Pat. No. 6,510, 019, entitled "Acceleration Tracking Position Controller", the disclosures of which are incorporated herein by reference as if set forth herein.

The methods described in these patents, generally referred to as just-in-time seeking (JITS), employ a set of seek-length dependent linear switching curves to determine the timing of switching the actuator 29 from acceleration to deceleration modes. In these methods, the present state of the system (e.g. position, velocity, and acceleration of the transducers 32) is determined. These values are used to estimate the amount of time, for example in spokes, will pass until the linear switching curve is crossed, at which point the deceleration phase is initiated. By knowing the amount of time (i.e. number of spokes) remaining before the switching point, it is possible to smoothly change the current command such that the transition to deceleration happens in a controlled fashion. However, in these methods, the switching curve is sometimes reached at very low velocities. That is, although the linear switching curve approach functions adequately in such cases, the deceleration phase of the seeks may become very conservative (meaning that less deceleration current is used over a longer time period).

If the deceleration phase is conservative, the power needed to decelerate the actuator 29 may be higher than necessary, potentially resulting in wasted energy.

In contrast, some embodiments use a nonlinear switching curve, or an approximation thereof, to determine an appropriate acceleration-to-deceleration switching point. Thus, some embodiments may allow the actuator 29 to approach the deceleration switching point at a higher velocity, potentially requiring less deceleration time and/or reducing deceleration power requirements.

Figure 6:
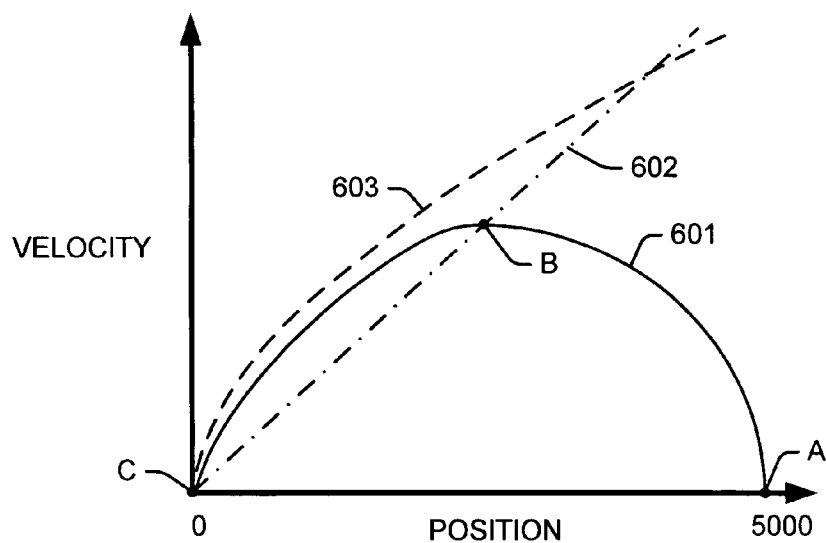
FIG. 6 is a phase-plane plot of an exemplary seek trajectory using a linear switching curve.

A linear switching curve and a switching limit curve are illustrated in FIG. 6, which is a phase-plane plot of a simulated seek operation based on the soft-switching and acceleration-track seek control algorithms described in the U.S. Pat. Nos. 6,597,529 and 6,510,029, respectively. A phase-plane plot is a plot of transducer velocity versus distance from a target track. In FIG. 6, the solid line 601 is an exemplary seek trajectory of velocity vs. position of the transducers 32. That is, the solid line represents a seek to a target track (at point C) from an initial track (at point A) that is located 5000 tracks away from the target track. The linear switching curve is shown as a dash-dot line 602, while the switching limit curve is shown as a dashed line 603.

The transducer begins at point A, which has position/velocity coordinates of (5000,0), indicating that the transducer 32 has an initial radial velocity of zero and is initially located 5000 tracks from the target track. From point A, the transducer begins to radially accelerate towards the target track. After initially accelerating at a high rate, the acceleration rate decreases as the transducer approaches the linear switching curve 602. After the seek trajectory 601 crosses the linear switching curve 602 at point B, the transducer begins to decelerate. Deceleration continues until the transducer reaches the target track at point C, which has position/velocity coordinates of (0,0). The deceleration rate should be controlled such that the velocity of the transducer 32 reaches zero at the same time as the transducer 32 reaches the target track.

The deceleration rate is further controlled in an attempt to ensure that the seek trajectory 601 does not cross the switching limit curve 603. The switching limit curve 603 represents the trajectory for which a full deceleration (i.e. deceleration in response to a maximum applied (saturated) deceleration current) results in a zero radial velocity upon arrival at the target track. Thus, if a seek trajectory crosses the switching limit curve 603, it has exceeded the maximum deceleration capability of the system. That is, for position/velocity coordinates (x(t), v(t)) to the left of the switching limit curve 603, the system cannot decelerate the transducer 32 fast enough to bring it to rest over the target track (i.e. at position C). As a result, the transducer 32 will overshoot the target track, and additional control action will be required to bring the head back to the target position. Such control action will cause a seek delay. Even worse, the overshoot may cause the transducer head and/or actuator arm to strike a crash-stop, which may cause damage to the transducer 32 and/or the actuator arm 33, as well as undesirable noise and/or vibration.

On the other hand, if the servo controller 56 switches from acceleration mode to deceleration mode too early (i.e. too far away from the switching-limit curve), it will take longer for the transducer 32 to arrive at the target track, which results in a longer seek time than necessary, and which may reduce I/O performance of the disk drive and/or may waste energy. Thus, it may be desirable to have the seek trajectory 601 approach as close as possible to the switching limit curve 603 before switching the servo controller 56 from acceleration mode to deceleration mode.

In the phase plane, the linear switching curve 602 has the following form:

$$V_L = mX \tag{1}$$

where X is the distance, in tracks, of the transducer 32 from the target track, $V_L$ is the transducer velocity, and m is a constant that defines the slope of the line.

In order to increase the aggressiveness of the deceleration phase, it may be desirable to use a switching curve that has a nonlinear shape. For example, a switching curve may be chosen having an exponential shape as follows:

$$V_{NL} = cX^n \tag{2}$$

wherein X and V are defined as in Equation (1) above, c is a constant, and n is an exponential value chosen to provide a desired shape for the switching curve. Unfortunately, it may not be practical to solve a switching function having a shape defined by Equation (2) in a real-time fashion, except for trivial solutions. Accordingly, some embodiments provide linear approximations to a nonlinear switching curve, as described below.

Based on the current state of the system (e.g. position, velocity and acceleration of the transducer 32), the estimated time before crossing the linear switching curve is given as follows:

$$\text{Est\_spokes\_until\_crossing} = \frac{mX_0 - V_0}{mV_0 + A_0} \tag{3}$$

where $X_0$, $V_0$ and $A_0$ represent the current state of the system (i.e. the current position, velocity and acceleration of the transducer 32) and m is the slope of the linear switching curve.

According to some embodiments, the slope of a nonlinear switching curve at the current position ($X_0$) is used along with an offset determined by the value of the nonlinear switching curve at the current velocity ($V_0$) to define a linearized switching curve that changes as the transducer 32 moves closer to the destination track.

Figure 7:
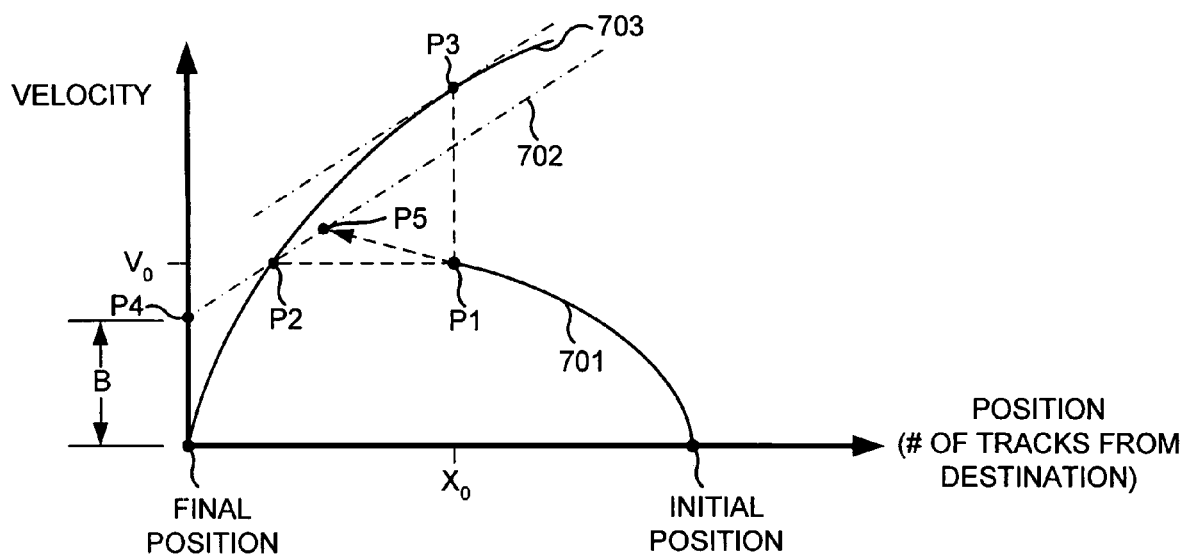
FIG. 7 is a phase-plane plot of an exemplary seek trajectory based on a nonlinear switching curve according to some embodiments.

FIG. 7 is a phase diagram illustrating operations according to embodiments. As shown therein, a disk transducer 32 is moved along a position/velocity trajectory 701 from an initial position towards a final position. At point P1 in the trajectory 701, the transducer 32 is located at position ($X_0$, $V_0$) on the phase diagram. A nonlinear switching curve 703 is defined. In some embodiments, the nonlinear switching curve 703 may have the same shape as the switching limit curve. However, the nonlinear switching curve may have a different shape than the switching limit curve.

A linearized switching curve 702 is constructed by determining (or estimating) the slope M of the nonlinear switching curve 703 at point P3, e.g. by evaluating the derivative of the nonlinear switching curve 703 at point ($X_0$, $f(X_0)$), where $f(x)$ is the function that defines the nonlinear switching curve 703. A y-intercept (i.e. offset) for the linearized switching curve 702 may be obtained by projecting a line having the slope M to point P4 on the velocity axis (y-axis) from the point P2 on the nonlinear switching curve 703 that corresponds to the current velocity $V_0$ of the transducer 32. Accordingly, the linearized switching curve 702 may constructed based on the shape of the nonlinear switching curve 703 and the current position/velocity/acceleration of the transducer 32. As seen in FIG. 7, the linearized switching curve 702 passes through point P2 on the nonlinear switching curve, and has the same slope as the slope of the nonlinear switching curve 703 at point P3.

The time until the transducer 32 crosses the linearized switching curve 702 (at point P5) is then estimated by projecting the current trajectory 701 onto the linearized switching curve 702. Based on the estimated crossing time, the current command may be controlled as described above to cause the transducer 32 to smoothly begin deceleration.

The nonlinear switching curve 703 may have the following form:

$$V_{NL} = CX^n \quad (4)$$

where X is the distance from the target track, C is a tuning constant, and n is a tuning exponent that determine the shape of the curve. The linearized switching curve 702 then has the following form:

$$V_{LIN} = MX + B \quad (5)$$

where M is the slope of the nonlinear switching curve 703 evaluated at point $(X_0, V(X_0))$. Accordingly, the slope M is given by Equation (6) as follows:

$$M = V_{NL}'(X_0) = nCX_0^{n-1} \quad (6)$$

As is apparent from FIG. 7, based on the shape of the nonlinear switching curve 703, the slope M may increase as the transducer 32 approaches the destination position.

Furthermore, the y-intercept (at point P4) may be obtained by projecting a line from point P2 to the y-axis. By solving Equation (4) for $V_{NL} = V_0$, point P2 may be determined to have the coordinates $$\left( V_0^{\frac{1}{n}} C^{-\frac{1}{n}}, V_0 \right).$$

Accordingly, the y-intercept B may be given by Equation (7) as follows:

$$B = V_0 - M \cdot V_0^{\frac{1}{n}} C^{-\frac{1}{n}} = V_0 - nC^{1-\frac{1}{n}} X_0^{n-1} V_0^{\frac{1}{n}} \quad (7)$$

The projection equation from the current trajectory 701 at point P1 to the linearized switching curve 702 at point P5 has the form shown in Equation (8) as follows:

$$V_{PROJ} = NX_0 + D \quad (8)$$

where N is the slope in the phase plane of the current trajectory 701 at point P1, and D is the y-intercept of the projection line from P1 to P5. N and D are given by equations (9) and (10), respectively, as follows:

$$N = -A_0/V_0 \quad (9)$$

$$D = V_0 - NX_0 \quad (10)$$

where $X_0$, $V_0$, and $A_0$ are the current position, velocity and acceleration, respectively, of the transducer 32 at point P1.

According to the new linearized switching curve 702 and the projection equation defined above in equations (9) and (10), the estimated time (in spokes) until the transducer 32 crosses the linearized switching curve 702 is given in Equation (11) as:

$$\text{Est\_spokes\_until\_crossing} = \frac{MX_0 - V_0 + B}{MV_0 + A_0} \quad (11)$$

It will be appreciated that Equation (11) has the same general form as Equation (3) above. However, the quantities M and B must be computed and/or retrieved from a lookup table based on velocity and position of the transducer 32. In contrast, in the case of a linear switching curve, the slope m may be simply looked up from a table based on the seek length. Since the maximum velocity of the seek is known a priori, it may be possible to calculate the quantities M and B at the start of the seek, which may reduce the complexity of the technique. The value of M could be scaled based on the maximum seek velocity. Alternatively, the value of M could be obtained from a lookup table based on seek length and maximum seek velocity.

Figure 8:
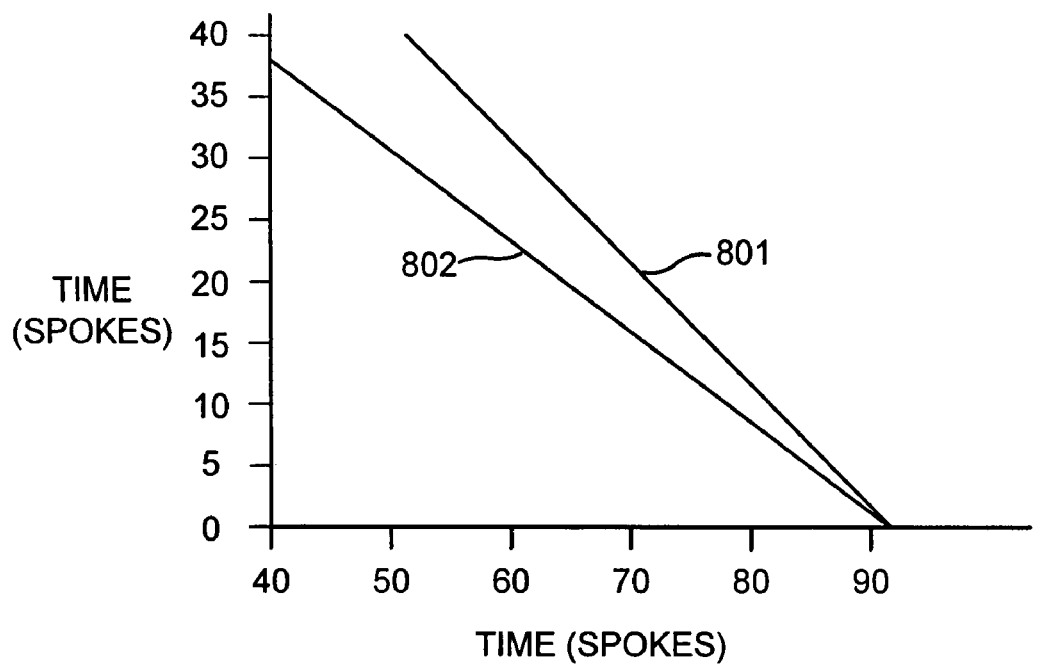
FIG. 8 is a representative graph of estimated versus actual switching times according to some embodiments.

It will be appreciated from an inspection of FIG. 7 that some embodiments may generally underestimate the distance from the current position of the transducer 32 to the linearized switching curve 702. This phenomenon is illustrated in the graph of FIG. 8, which is a plot of the actual time (in spokes) until the switching point (Curve 801) and the estimated time (in spokes) until switching point (Curve 802) versus the time (in spokes) of the seek according to some embodiments. As can be seen in FIG. 8, the estimated time until the switching point continuously underestimates the actual time until the switching point. Thus, the chance of accidentally overshooting the switching limit curve may be reduced.

Figure 9:
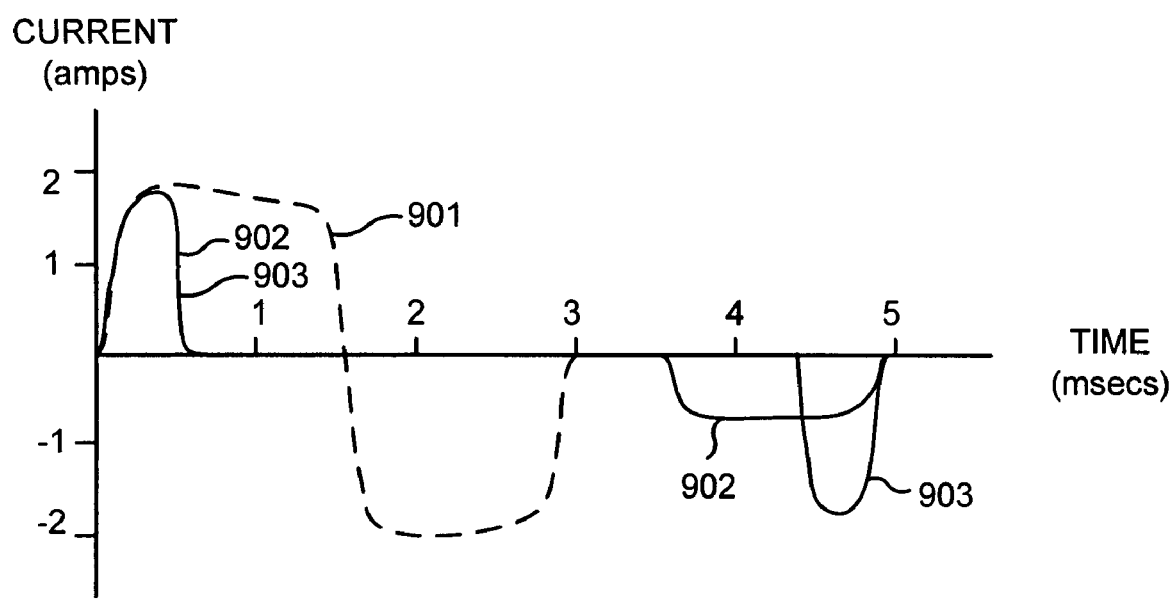
FIG. 9 is a representative graph an actuator current profile for a seek operation according to some embodiments.

FIG. 9 is a graph of a representative actuator current signals for various seek profiles for a seek of a given length. For example, the current signal 901 represents a maximum current seek in which the actuator current is raised to a maximum forward level for acceleration and then switched to a maximum reverse level for deceleration. Although the seek time is shorter (3 ms) using the maximum current seek, such a seek profile may result in undesirable post-seek oscillation of the actuator mechanism, which may result in unacceptable levels of transducer position error. Moreover, depending on the location of the origin and destination spokes, it may be unnecessary to accelerate and decelerate the transducer 32 so quickly if the system must then wait for the disk to rotate to a target spoke before read/write operations can be performed.

The just-in-time soft-switching and acceleration-track seek control algorithms described in the U.S. Pat. Nos. 6,597,529 and 6,510,029 reduce post-seek oscillation by providing just enough acceleration and deceleration current to cause the transducers to arrive at the target track and spoke at the same time. The current signal 902 is a representative actuator current signal based on the soft-switching and acceleration-track seek control algorithms described in the U.S. Pat. Nos. 6,597,529 and 6,510,029. As described above, because of the static nature of the linear switching curve, the deceleration portion of the current signal 902 begins well before the seek end (at 5 ms).

Curve 903 is a representative actuator current signal according to some embodiments. Because the seek time may be determined according to similar methods as those described in the U.S. Pat. Nos. 6,597,529 and 6,510,029, the acceleration portion of the Curve 903 is similar to the acceleration portion of Curve 902. However, as shown in FIG. 9, the deceleration portion of the Curve 903 begins substantially later than Curve 902 and lasts for a significantly shorter time. Accordingly, the energy used to decelerate the transducer 32 may be reduced.

Since the deceleration current according to some embodiments may be increased compared to conventional just-in-time seeking, some additional post-seek oscillation may be imparted to the transducer 32. However, the post-seek oscillation may still be substantially lower than the oscillation that may be caused by a full power seek.

According to some embodiments, a single nonlinear switching-limit curve is defined for all seek lengths and is used to find the corresponding acceleration to deceleration switching point. Thus, in some embodiments, it may not be necessary to calculate, store and/or update multiple linear switching curves for multiple seek lengths. Accordingly, memory usage requirements may be reduced and/or the seek tuning process may be simplified.

In the drawings and specification, there have been disclosed typical preferred embodiments and, although specific terms are employed, they are used in a generic and descriptive sense only and not for purposes of limitation, the scope being set forth in the following claims.

What is claimed is:

1. A method of controlling seeking of a transducer, comprising:
    accelerating the transducer to a seek velocity;
    generating a linearized switching curve defining a position and velocity of the transducer at which deceleration should begin using a nonlinear switching curve; and
    controlling the velocity of the transducer in response to the current position and seek velocity of the transducer relative to the linearized switching curve.

2. The method of claim 1, wherein the linearized switching curve has a slope and an offset that are determined relative to a nonlinear switching curve in response to the seek velocity and a current position of the transducer.

3. The method of claim 2, wherein the linearized switching curve is generated to have a slope that increases as the transducer approaches a destination track.

4. The method of claim 2, wherein the slope of the linearized switching curve is selected from a lookup table based on the seek velocity and based on the current position of the transducer.

5. The method of claim 2, wherein the nonlinear switching curve corresponds to a saturated current deceleration curve.

6. The method of claim 2, wherein the linearized switching curve is generated to have a slope that corresponds to the slope of the nonlinear switching curve at the current position of the transducer.

7. The method of claim 2, wherein the offset of the linearized switching curve is determined in response to the slope of the linearized switching curve and a value of the nonlinear switching curve at the seek velocity.

8. The method of claim 2, wherein the nonlinear switching curve has a shape given by the equation:

$$V_{NL}=CX^n$$

and wherein the linearized switching curve is generated to have a shape given by the equation:

$$V_{LIN}=MX+B$$

where X represents distance from a target track, C and n are constants that define the shape of the nonlinear switching curve, M is the slope of the linearized switching curve and B is the offset of the linearized switching curve.

9. The method of claim 8, wherein the linearized switching curve is generated to have a slope given by the equation:

$$M=nCX_0^{n-1}$$

wherein $X_0$ represents the current position of the transducer.

10. The method of claim 9, wherein the linearized switching curve is generated to have an offset given by the equation:

$$B=V_0-M \cdot V_0^{1/n} C^{-1/n}$$

wherein $V_0$ represents the seek velocity.

11. The method of claim 10, wherein the estimated time before a current trajectory of the transducers will cross the linearized switching curve is given by the equation:

$$\text{Est\_spokes\_until\_crossing} = \frac{MX_0 - V_0 + B}{MV_0 + A_0}$$

wherein $A_0$ represents a current acceleration of the transducer.

12. A method of controlling seeking of a transducer that is adjacent to a rotatable disk in a disk drive, comprising:
    accelerating the transducer radially across the rotatable disk from an initial track toward a destination track by applying an acceleration current to an actuator associated with the transducer; and
    changing the acceleration of the transducer relative to a linearized switching curve generated in response to a nonlinear switching curve and a current velocity and current position of the transducer.

13. The method of claim 12, further comprising estimating a time before a current trajectory of the transducers will cross a linearized switching curve having a slope and an offset that are determined relative to a nonlinear switching curve in response to a current velocity and a current position of the transducer.

14. The method of claim 13, further comprising reducing the acceleration current as the transducer approaches the linearized switching curve.

15. The method of claim 13, further comprising applying a deceleration current to the actuator when the transducer reaches the linearized switching curve.

16. An apparatus, comprising:
    an actuator configured to move a load from an initial location to a target location; and
    a servo controller that controls the velocity of the load relative to a linearized switching curve defining a position and velocity of the load at which deceleration should begin, wherein the linearized switching curve is generated using a nonlinear switching curve.

17. The apparatus of claim 16, wherein the servo controller accelerates the load to a seek velocity in response to a seek command, generates the linearized switching curve, wherein the linearized switching curve has a slope and an offset that are determined in response to the seek velocity and a current position of the load relative to a nonlinear switching curve, and controls the velocity of the load in response to the current position and seek velocity of the load relative to the linearized switching curve.

18. The apparatus of claim 17, wherein the servo controller selects the slope of the linearized switching curve from a lookup table based on the seek velocity and based on the current position of the load.

19. The apparatus of claim 17, wherein the nonlinear switching curve corresponds to a saturated current deceleration curve.

20. The apparatus of claim 17, wherein the slope of the linearized switching curve corresponds to the slope of the nonlinear switching curve at the current position of the load.

21. The apparatus of claim 16, wherein the servo controller determines the offset of the linearized switching curve in response to the slope of the linearized switching curve and a value of the nonlinear switching curve at the seek velocity.

22. The apparatus of claim 16, wherein the nonlinear switching curve has a shape given by the equation:

$$V_{NL} = CX^n$$

wherein the linearized switching curve has a shape given by the equation:

$$V_{LIN} = MX + B$$

wherein the slope of the linearized switching curve is given by the equation:

$$M = nCX_0^{n-1}$$

wherein the offset of the linearized switching curve is given by the equation:

$$B = V_0 - M \cdot V_0^{\frac{1}{n}} C^{-\frac{1}{n}}$$

where X represents distance from the target location, C and n are constants that define the shape of the nonlinear switching curve, M is the slope of the linearized switching curve, B is the offset of the linearized switching curve, $X_0$ represents the current position of the load, and $V_0$ represents the seek velocity.

23. The apparatus of claim 22, wherein the estimated time before a current trajectory of the loads will cross the linearized switching curve is given by the equation:

$$\text{Est\_spokes\_until\_crossing} = \frac{MX_0 - V_0 + B}{MV_0 + A_0}$$

wherein $A_0$ represents a current acceleration of the load.

* * * * *